United States Patent [19]
Christopher et al.

[11] Patent Number: 4,886,944
[45] Date of Patent: Dec. 12, 1989

[54] PRESSURE OR DRAW BAR OF FIBER-REINFORCED INSULATING MATERIAL

[75] Inventors: Hans-Gunther Christopher; Joachim Thurk; Dieter Noack; Thomas Schultz, all of Berlin, Fed. Rep. of Germany

[73] Assignee: Siemens Aktiengesellschaft, Berlin & Munich, Fed. Rep. of Germany

[21] Appl. No.: 281,905

[22] Filed: Dec. 6, 1988

Related U.S. Application Data

[63] Continuation of Ser. No. 128,265, Dec. 3, 1987, abandoned.

[30] Foreign Application Priority Data

Dec. 4, 1986 [DE] Fed. Rep. of Germany ....... 3641632
Mar. 30, 1987 [DE] Fed. Rep. of Germany ....... 3710493

[51] Int. Cl.4 .............................................. H01H 9/00
[52] U.S. Cl. .................................. 200/48 R; 200/237
[58] Field of Search ................. 200/485 B, 48 R, 237; 403/297, 370, 374

[56] References Cited

U.S. PATENT DOCUMENTS 3,731,018 5/1973 Spisak et al. ...................... 200/48 R
4,319,076 3/1982 Piur ..................................... 174/178

FOREIGN PATENT DOCUMENTS 0115763 8/1984 European Pat. Off. .
0087384 1/1986 European Pat. Off. .
21566141 11/1984 Fed. Rep. of Germany .... 200/48 R
2343918 10/1977 France .
571545 1/1958 Italy ................................. 403/277
2051303 1/1981 United Kingdom .

Primary Examiner—Renee S. Luebke
Attorney, Agent, or Firm—Kenyon & Kenyon

[57] ABSTRACT

A pressure or draw bar of fiber-reinforced insulating material, in particular for a high voltage circuit breaker. The pressure or draw bars of fiber-reinforced insulating material are provided with connecting elements for the introduction of force for operating the circuit breaker. The connecting apertures of the draw bar which allow connection to the circuit breaker should be simple to adjust and secure, but should be fixable in a manner which permits ready detachment. The connecting apertures of the connecting elements are arranged in a fork part, to which a slit pipe part with external threads lies adjacent. In the slit pipe part a spreading body is arranged held by a screw, which in the region of the fork part has a surface accessible for generating a rotational motion. The spreading body can thus by spreading apart the slit pipe part determine the height of the connecting apertures with respect to the bar. The fitting body is surrounded on the outside by a ring as screening.

4 Claims, 1 Drawing Sheet

PRESSURE OR DRAW BAR OF FIBER-REINFORCED INSULATING MATERIAL

This application is a continuation of application Serial No. 128,265, filed Dec. 3, 1987, now abandoned.

BACKGROUND OF THE INVENTION

The present invention relates to pressure or draw bars, in particular switch bars or coupling rods (draw bars) of high-voltage circuit-breakers, of fiber-reinforced insulating material with metallic fittings on the front faces thereof for pressure or force transmission, in which the fiber-reinforced insulating material contains fibers oriented parallel to the axis of the draw bar which are secured in recesses arranged between the fitting body and transversely to the bar axis with tying elements absorbing the forces and being impregnated with a curable synthetic material which is subsequently cured, and in which the fitting body has internal threads, into which a connecting element having external threads is screwed, which connecting element has at least one connecting aperture.

Such pressure or draw bars are known from E-A2-0 115 763. In these known bars the connecting element serving to introduce force consists of a simple threaded bolt with a connecting aperture, which is screwed into the internal threads of the fitting body and is height-adjusted by a nut resting against the front face of the fitting body. The bar itself consists of a core of rigid expanded plastics, on which several layers of insulating fibers of high tensile strength are applied axis-parallel or extending obliquely to the axis, which are impregnated with synthetic resins and cured. These fibers consist of at least one layer of axis-parallel fibers, which, before being cured, are secured in suitable manner on the external surface of the metallic fitting body, for example through tying into annular grooves, which are located on the outer surface of the fitting body. The given height-adjustability of the connecting aperture, obtained by screwing the connecting element into the fitting body to different depths is, however, relatively unstable, since the position—once it has been selected—is only secured by a nut, which can loosen through changing force transmissions and, furthermore, requires additional construction lengths.

Furthermore, from E-B1-0 087 384 it is known that for manufacturing such, in particular, hollow-cylindrical pressure or draw bars, that fibers oriented essentially parallel to the bar axis and conical fitting bodies, which have external screw-shaped recesses, in which the fibers are secured form-fittingly, can be used. The fibers in this arrangement are led to and from in layers and always secured in the recesses, for which a wire, a piece of cord or any other tying element, which absorbs tensile forces, is used, which is placed screw-shaped into the recesses. Subsequently, the pressure or draw bar is impregnated with a curable synthetic material and—after this step—curing takes place. In this way particularly good force transmission between the pressure or draw bar and the fitting bodies are obtained, because in this transmission it is primarily the fibers that participate, while the synthetic material, which penetrated during impregnation, during shaping and subsequently during curing is only indirectly involved.

Particularly advantageous is use of such pressure or draw bars known from E-B1-0 087 384 of electrically insulating synthetic materials as transmission elements in high-voltage circuit breakers, the switch sites of which standing at high-voltage potential are actuated by a drive connected to ground potential, because these permit particularly good securing of the fibers at the metallic fitting bodies serving as reinforcement of the insulating material.

SUMMARY OF THE INVENTION

The invention is based on the task of developing the connecting elements serving for force introduction of such pressure or draw bars, so that a precisely defined position of the connecting aperture can be determined simply and securely and yet can be undone.

In order to achieve the objects of the invention, a pressure or draw bar of the above mentioned kind is provided so that the connecting element consists of a fork part with a connecting aperture and a slit pipe part with external threads, the center region of the fork part closing the pipe part and providing a front wall and having a central bore, the inner face of the pipe part extending conically inclined and expanding toward the open front face, and a spreading body having an oppositely inclined external surface being arranged in the interior of the pipe part of the connecting element, which by a central screw penetrating the bore in the front wall of the connecting element is held in the latter, and which has accessible areas lying in the region of the fork for the generation of rotational motion.

This connecting element can initially simply be screwed into the fitting body corresponding to the intended height of the connecting aperture. Subsequently, the spreading body, which is readily accessible in the forked part of the connecting element and can be rotated from there, is pulled upward. This causes spreading of the slit and thus elastically resilient pipe part of the connecting element, so that the play in the threaded part is eliminated and firm form-fitting closure to the fitting body of the pressure or draw bar is obtained. This form-fitting closure ensures that the height-adjustment of the connecting element does not change even under frequently changing force loads. Nevertheless, this determination can be cancelled and changed anytime by loosening the spreading body. In order to accomplish this, due to the central position of the screw, only slight rotational momentum is necessary.

This arrangement, furthermore, has the advantage, that the region in which the position is secured lies in the region of the slide-in threads by way of which force is transmitted. This allows particularly short construction.

It is best if the angle of inclination of the internal surface of the pipe part and correspondingly the slope of the spreading body is selected so that automatic locking of the spreading body against sliding out occurs.

It is, furthermore, advantageous, if the spreading body has barrel-shaped outer surfaces. This ensures a contact line-defined with respect to its position - between the outer surface of the spreading body and the conically inclined inner surface of the connecting element.

BRIEF DESCRIPTION OF THE DRAWINGS

Below, the invention is explained in greater detail in conjunction with an embodiment represented in the drawings, in which.

DETAILED DESCRIPTION

Figure 1:
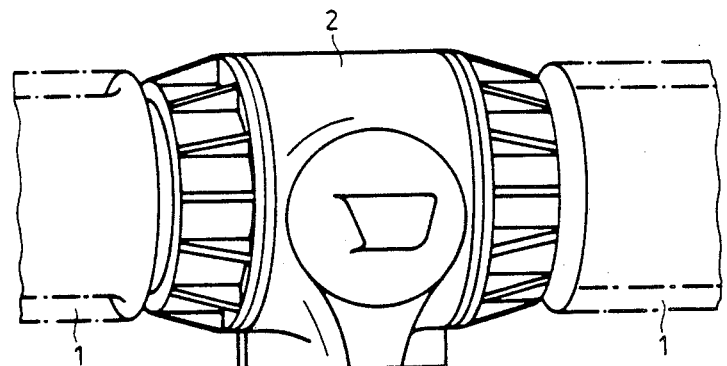
FIG. 1 shows schematically, partially in section, the upper part of the support insulator of a high-voltage circuit breaker with the gearing housing and the breaker units.
Figure 2:
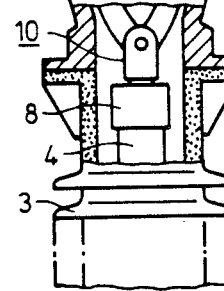
FIG. 2 shows on an enlarged scale the connection of the switch bar to the intermediate gearing.
Figure 2:
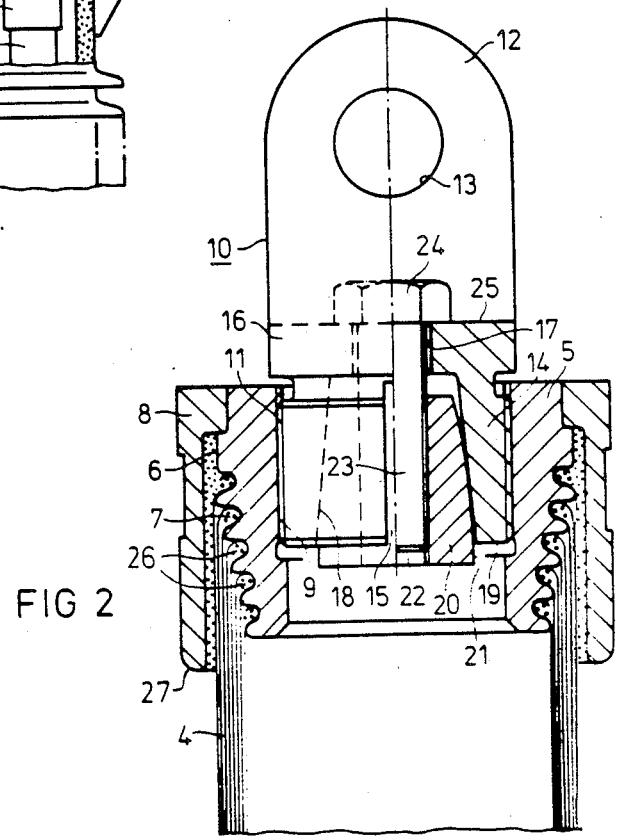

In an electrical high-voltage circuit breaker, the switching contacts in the breaker units 1—not shown here—are moved by way of intermediate gearing 2 by the switch bar 4 with the aid of a drive unit also not shown here. This drive unit is at ground potential. The live parts in the breaker unit 1, however, are at high-voltage potential so that the switch bar 4 consists of a fiber-reinforced insulating material.

To introduce the pressure or tensile forces into the switch bar 4 necessary for switching the electrical high-voltage circuit breakers and to transmit them further, the switch rod 4 at its front faces is provided with metallic fitting bodies 5. These fitting bodies 5 have on their outer surface 6 recesses 7, which extend in the circumferential direction and in which the fibers reinforcing the insulating material are secured —before curing —with wires, chords, or other rope-like flexible tying elements 26, which absorb tensile forces. Hence, after curing the synthetic resin used for impregnating the fibers, a tight connection between the fitting body 5 and the insulating material of the switch bar 4 exists, which is further supported by a ring 8 which surrounds the fitting body 5 on the outside. This ring 8 consists of electrically conducting material, in particular of metallic materials, built as electrical screening. To this end, it has —on the side facing the switch bar 4—a rounded contour 27, so that—as is known—partial discharges on projections and edges of the fitting body 5 are avoided.

The fitting body 5, furthermore, has internal threads 9, into which a connecting element 10 with corresponding outer threads 11 is screwed. This connecting element 10 consists of a fore part 12 with connecting apertures 13 and a pipe part 14, which has outer threads 11. The pipe part 14 of the connecting element 10 is, furthermore, provided with slits 15, through which it obtains a certain elastic resiliency. The pipe part 14 is closed off on the other side by a front wall 16, which forms the center region of the fork part 12. This front wall 16 has a center bore 17. The inner surface 18 of the pipe part 14 extends conically inclined in such a way, that the interior space of the pipe part 14 is enlarged toward the open front face 19.

Furthermore, a spreading body 20 with oppositely inclined barrel-shaped outer surfaces 21 is provided. This spreading body 20, additionally, has a center tap hole, into which the screw 23 is screwed, which penetrates the center bore 17 in the front wall 16 of the connecting element 10 and the head 24 of which rests against the outer surface 25 of the front wall 16. The spreading body 20 is thus held by the screw 23 in the connecting element 10.

The position of the connecting apertures 13 with respect to the switch bar 4 and with respect to other switch parts can be set in that the connecting element 10 is screwed into the fitting body 5 to different depths. Once, this position adjustment has occured it is secured in that position by rotation of the head 24 of the screw 23 lying in the fork part 12 and accessible from the outside, the spreading body 20 thus being moved in the direction of the front wall 16 and in this way pushes the slit pipe part 14 of the connecting element 10 apart, so that between the fitting body 5 and the connecting element 10 a firm form-fitting closure results, which prevents further rotation of the connecting element 10 in the fitting body 5 and thus a change of the position of the connecting apertures. This fixation of the position of the connecting apertures 13 can thus no longer be effected by the force transmission in alternating directions during operation of the electrical high-voltage circuit breaker.

Once carried out, the position adjustment of the connecting apertures 13 with respect to the switch bar 4 is thus maintained until through actuation of the screw 23 the form-fitting closure effected by the spreading body 20 between the connecting element 10 and the fitting body 5 is again undone.

What is claimed is:

1. A coupling bar in particular for a circuit breaker comprising fiber-reinforced insulating material having a metallic fitting body on a face thereof for transmission of forces, the fiber-reinforced insulating material containing fibers oriented parallel to an axis of the coupling bar, said fibers being secured in form fitting manner in recesses disposed in the fitting body, said recesses extending transversely to the axis of the coupling bar, said fibers being secured in the recesses by tying means for absorbing tensile forces and being impregnated with a curable synthetic material which is thereafter cured, the fitting body having internal threads into which threads a connecting element having external threads is screwed, said connecting element having at least one connecting aperture, the connecting element comprising a fork part in which said connecting aperture is located and further having a slit pipe part having said external threads received in the internal threads of the fitting body, the fork part having a center region closing off the pipe part and providing a wall having a center bore, the pipe part having an internal surface extending conically inclined such that said internal surface expands toward an open face of the pipe part, a spreading body with an oppositely inclined outer surface being arranged in the interior of the pipe part of the connecting element, a screw being provided penetrating through the bore in the wall of the connecting element and holding said spreading body in said pipe part, said screw having an accessible surface in the center region of the fork part for generating a rotational motion thereby allowing said spreading body to force said pipe part external threads against said fitting body internal threads to secure said pipe part in a fixed orientation to said fitting body, said pipe part being secured to said fitting body even when said spreading body loosely engages said internal surface of said pipe part, and when said spreading body does not contact said internal surface of said pipe part, thereby to maintain adjustment of said pipe part with respect to said fitting body even when an axial force is applied to said fitting body, said pipe part being adjustable with respect to said fitting body when said spreading body is loosely disposed in said pipe part and being rigidly fixed to said fitting body when said spreading body tightly engages the internal surface of said pipe part.

2. The coupling bar recited in claim 1, wherein the pipe part internal surface has an angle of inclination, the angle of inclination of the internal surface of the pipe part and correspondingly an angle of inclination of the spreading body providing automatic locking against sliding out of the spreading body.

3. The coupling bar recited in claim 1, further comprising a ring of electrically conducting material surrounding the fitting body on an exterior surface of the coupling bar arranged adjacent the recesses, for providing electrical screening.

4. The coupling bar recited in claim 1, wherein the outer surface of the spreading body is barrel-shaped.

* * * * *